United States Patent [19]

Matsuoka et al.

[11] Patent Number: 5,174,821
[45] Date of Patent: Dec. 29, 1992

[54] HYDRAULIC COMPOSITION, FORMED PRODUCTS THEREFROM AND SEGREGATION REDUCTION AGENT FOR HYDRAULIC SUBSTANCES

[75] Inventors: Yasunori Matsuoka; Takefumi Shindoh; Kazunao Yokota; Takafumi Naito, all of Tokyo; Akira Haze; Kiyoshi Nara, both of Kyoto, all of Japan

[73] Assignees: Taisei Corporation, Tokyo; Takeda Chemical Industries, Ltd., Osaka, both of Japan

[21] Appl. No.: 877,378

[22] Filed: Apr. 29, 1992

Related U.S. Application Data

[63] Continuation of Ser. No. 624,743, Dec. 11, 1990, abandoned.

[30] Foreign Application Priority Data

Dec. 12, 1989 [JP] Japan ................... 1-320465
Nov. 1, 1990 [JP] Japan ................... 2-293677

[51] Int. Cl.⁵ ................................. C04B 24/10
[52] U.S. Cl. .................................. 106/730; 106/617; 106/674; 106/687; 106/696; 106/708; 106/779; 106/790; 106/795; 106/823; 264/333
[58] Field of Search ............... 106/730, 804, 617, 674, 106/687, 696, 708, 779, 790, 795, 823; 264/333

[56] References Cited

U.S. PATENT DOCUMENTS

| | | |
|---|---|---|
| 3,432,317 | 3/1969 | Kelly et al. |
| 3,528,832 | 9/1970 | Ericsson et al. ........... 106/695 |
| 3,532,781 | 10/1970 | Shannon |
| 3,714,047 | 1/1973 | Marion et al. ........... 252/3 |
| 4,073,658 | 2/1978 | Ohtani et al. ........... 106/804 |
| 4,210,456 | 7/1980 | Miller |
| 4,394,335 | 7/1983 | Roth et al. |
| 4,462,836 | 7/1984 | Baker et al. |
| 4,482,384 | 11/1984 | Miller |
| 4,488,910 | 12/1984 | Nicholson et al. |
| 4,548,286 | 10/1985 | Stipanovic ........... 252/8.554 |
| 4,573,534 | 3/1986 | Baker et al. |
| 4,662,943 | 5/1987 | Baker et al. |
| 4,689,079 | 8/1987 | Buma et al. ........... 106/35 |
| 4,695,494 | 9/1987 | Fowler et al. |
| 4,941,533 | 7/1990 | Buller et al. ........... 252/8.554 |
| 5,006,170 | 4/1991 | Schwarz et al. ........... 106/20 |
| 5,043,310 | 8/1991 | Takeuchi et al. ........... 502/404 |

FOREIGN PATENT DOCUMENTS

| | | |
|---|---|---|
| 0409609 | 1/1991 | European Pat. Off. |
| 0432770 | 6/1991 | European Pat. Off. |
| 57-67057 | 4/1982 | Japan |
| 1425822 | 2/1976 | United Kingdom |
| 86/00294 | 12/1986 | World Int. Prop. O. |

OTHER PUBLICATIONS

Chemical Abstract, vol. 102, No. 22, p. 307, Abstract No. 189912n.
World Patents Index Latest, week 16, Accession No. 91-113415, Derwent Publications Ltd. (JP-A-3 054 157).

*Primary Examiner*—Karl Group
*Assistant Examiner*—Anthony J. Green
*Attorney, Agent, or Firm*—Beveridge, DeGrandi & Weilacher

[57] ABSTRACT

This invention provides a hydraulic composition which contains a cementitious material in powder form, $\beta$-1,3-glucan, and a superplasticizer. The composition makes it possible to prepare concrete with high resistance to segregation, high fluidity, and excellent filling ability. Because of this, vibration of the concrete is not necessary during casting; it can simply be poured.

19 Claims, 3 Drawing Sheets

AFTER 90 SECONDS

AFTER 99 SECONDS

HYDRAULIC COMPOSITION, FORMED PRODUCTS THEREFROM AND SEGREGATION REDUCTION AGENT FOR HYDRAULIC SUBSTANCES

This application is a continuation of application Ser. No. 07/624,743, filed Dec. 11, 1990, now abandoned.

BACKGROUND OF THE INVENTION

This invention relates to hydraulic compositions, products formed therefrom and segregation reduction agents for hydraulic substances, which compositions contain β-1,3-glucan, and which exhibit high fluidity, high filling capacity, and which are very high in resistance to segregation and useful for such as mortar or concrete.

Technology which imparts high fluidity to concrete and which gives it high filling capacity and makes it possible to pour the concrete without consolidation has been disclosed as the so-called "high performance concrete" developed by Professor Okamura of the Department of Engineering of Tokyo University (see Doboku Seko, October 1989). Also, viscosity improving agents have been added to concrete to prevent segregation of the ingredients in the mortar or concrete.

The following problems are, however, associated with the prior art.

(a) In the case of high performance concrete, it is necessary to carefully select the materials in order to produce a concrete which has a very high powder content and moreover, small amounts of viscosity enhancers must be used in order to prevent separation of the concrete while it is in the fluid state. Because of this, very careful quality control must be exercised over the materials being used, and strict production control is also required. It is quite difficult to perform on-site formulation and utilization of this type of concrete.

(b) Concrete to which antiwashout admixtures have been added to prevent segregation has poor fluidity, so when it is poured into highly reinforced forms, it is very difficult to achieve proper filling without consolidation. Also, because it has a large unit water content, the water density declines which lowers its resistance to carbonation, causes a high degree of shrinkage during drying, and which, due to the large air bubbles within, causes lowered resistance to freezing and thawing and thus, lowered durability.

The object of this invention is to improve upon the above described problems and provide hydraulic compositions, products formed thereafter and separation reduction agents, useful for such as mortar or concrete, which offer high fluidity, high filling capacity, and high resistance to segregation which make it possible to pour the concrete without consolidation and still achieve excellent durability.

SUMMARY OF THE INVENTION

The present invention relates to 1) a hydraulic composition which contains a cementitious material in powder form, β-1,3-glucan, and a superplasticizer; and 2) the formed product when water is added to said composition and the composition is then allowed to harden over a certain period of time; and 3) a segregation reducing agent containing β-1,3-glucan which is added to hydraulic substances.

DESCRIPTION OF PREFERRED EMBODIMENTS

Figure 1:
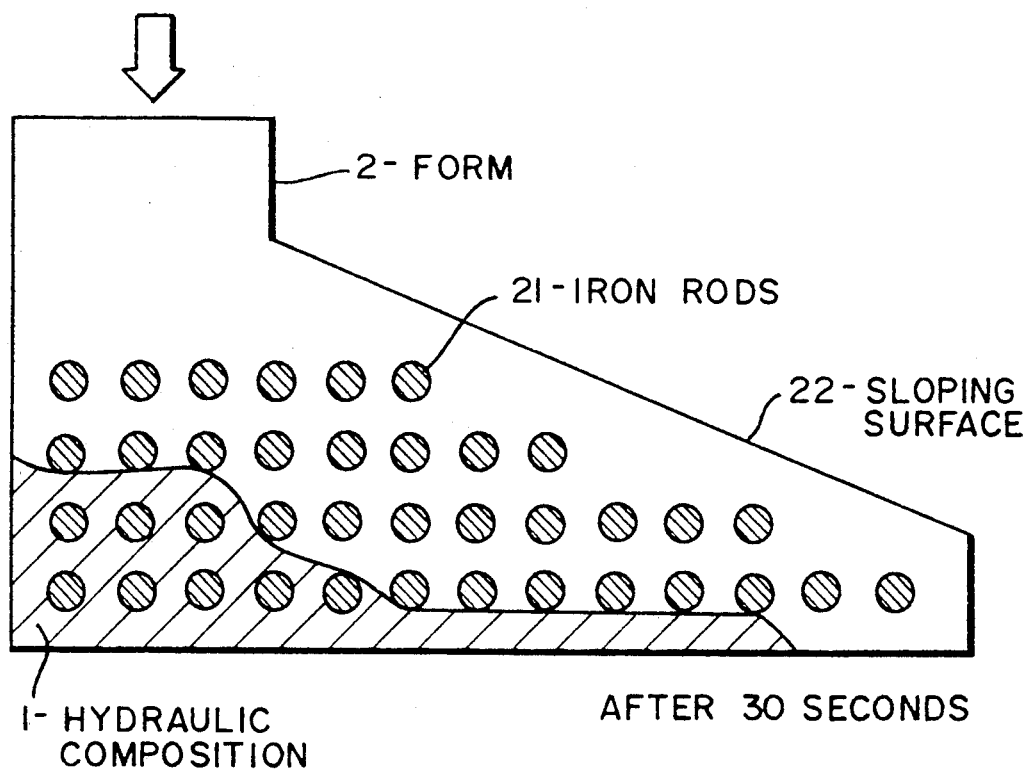
FIGS. 1 through 4 are illustrative figures showing the conditions for the filling tests.
Figure 2:
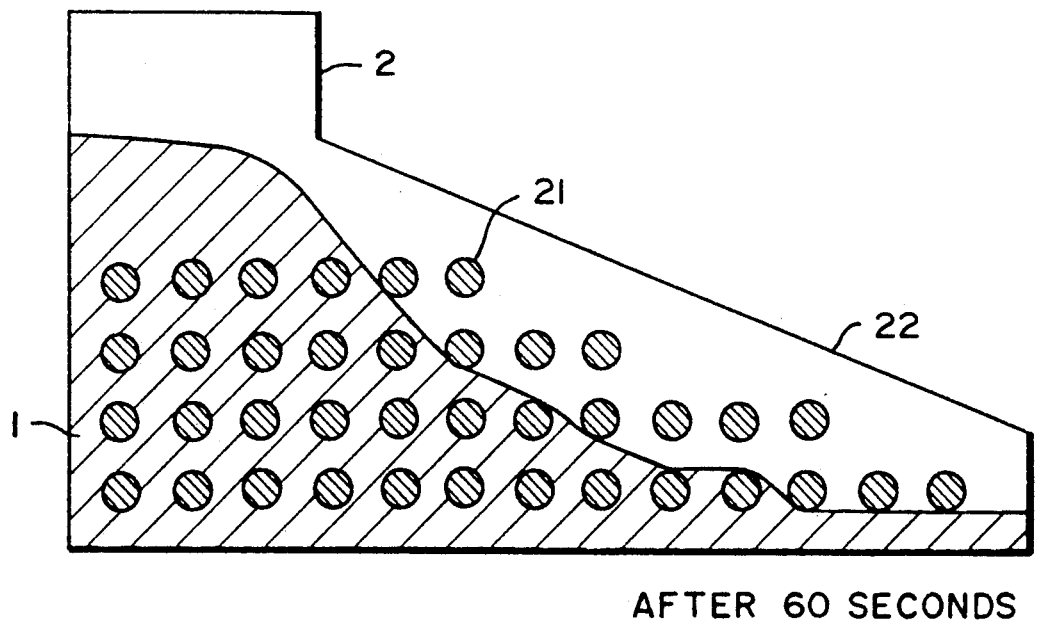
Figure 3:
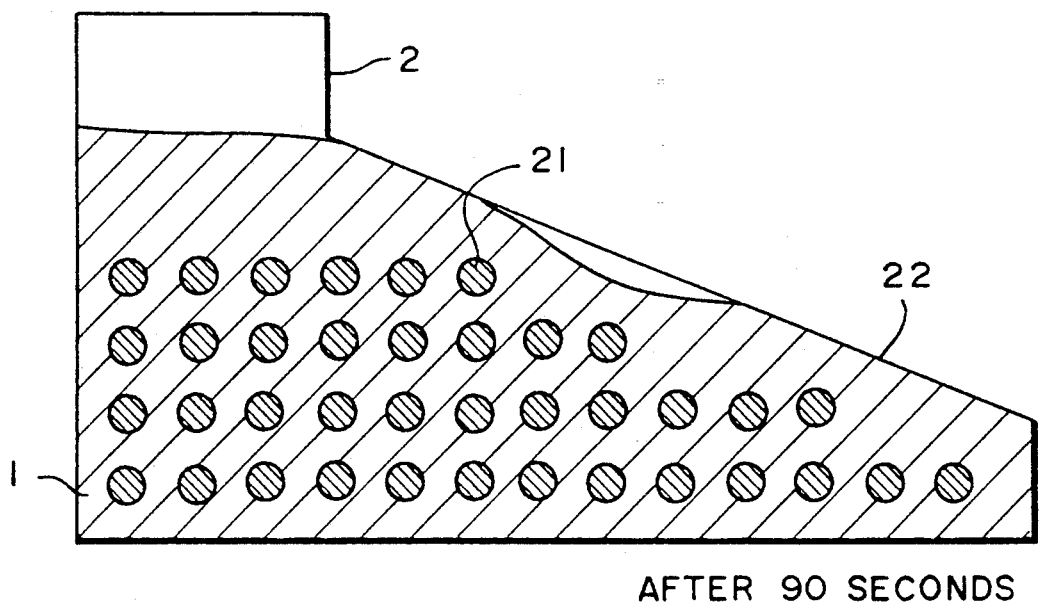
Figure 4:
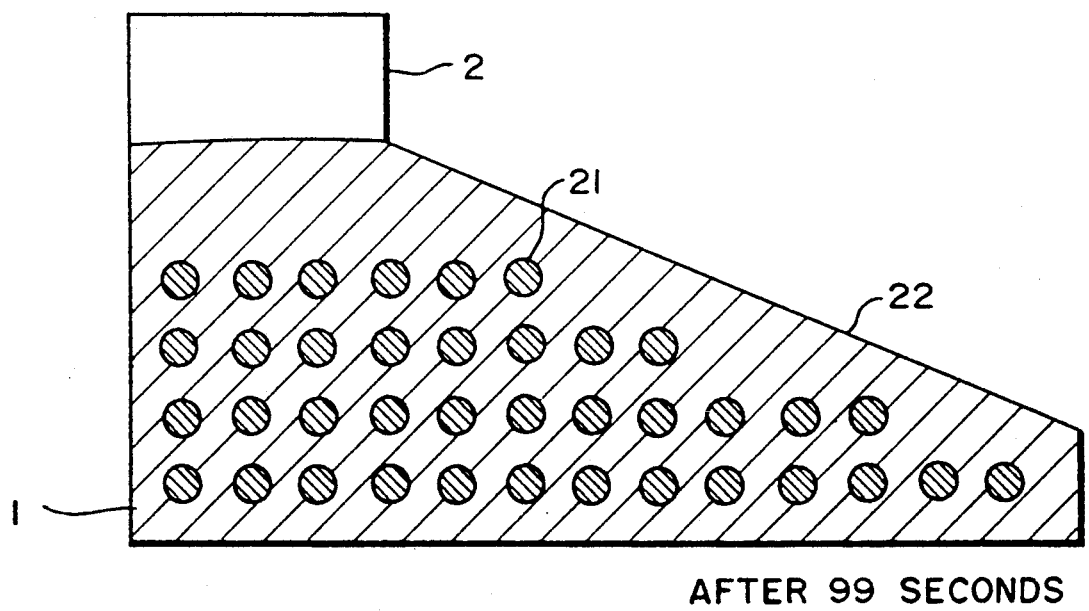

The cementitious powder material used in this invention may be cement, lime, gypsum, calcium silicate, calcium carbonate, magnesium carbonate, magnesium trisilicate, etc. Various types of cements such as Portland cement, which contain quality improving additives such as diatomaceous, silica, earth, blastfurnace slag, fly ash, silica fume may be used in this invention. Very desirable effects are obtained when an ultra-fine powder is added as a quality improving agent such as silica fume, in which the silica is present in the form of an ultra fine powder (200,000 $cm^2/g$ or higher). In other words, this ultra fine powder has a very high surface area and is of a size which is one order or more smaller than normally used in cements. By so doing; the viscosity increases and this permits the reduction in the amount of viscosity agent used in the composition so better filling and fluidity are obtained. As a result of reducing the amount of viscosity agent added to the composition, it is possible to realize improvements in the compression strength of the set concrete.

By using Portland cement as the cementitious powder, it is possible to make cement slate boards; or, by using calcium silicate as the main component of the hydraulic powder substance and using silica, diatomaceous earth or lime in the composition, one can prepare calcium silicate boards. The incorporation of slag, gypsum, or lime can similarly be used to obtain a slag-gypsum type of board. In addition, by selecting or combining the hydraulic powder, one can prepare gypsum board, magnesium carbonate board, or calcium carbonate board, etc.

The β-1,3-glucan is a polysaccharide containing glucose which is primarily β-1,3- bonded. Specific examples are curdlan, paramylon, pachyman, scleroglucan, laminalrin and yeast glucan, etc. In this invention, curdlan is especially preferred.

Curdlan, as described in Volume 20 Number 10, pp 49–59 (1978) in New Food Industry is primarily composed of β-1,3-glucoside, a polysaccharide which coagulates when heated. When heated in the presence of water, in other words, this polysaccharide coagulates (forms a gel).

These polysaccharides can be produced by microorganisms which belong to the genus Alcalioenes or the genus Aqrobacterium. Specific examples are the polysaccharide produced by *Alcalioenes faecalis var.* (1) myxogenes 10C3K which is referenced in Agricultural Biological Chemistry, Volume 30 page 196 (1966); the polysaccharide produced by *Alcaligenes faecalis var.* (1) myxogenes 10C3K mutated bacteria NTK-u (IFO 13140) (See Japanese Kokoku (examined) Patent No. 48-32673/1973); or the polysaccharides produced by *Agrobacterium radiobacter* (IFO 13127 or its mutant strain U-19 (IFO 12126).

Curdlan is a polysaccharide which is produced as described above by microorganisms, but in this invention, one may use it as-is, in an unrefined form, or if necessary, highly refined curdlan may also be used.

Paramylon is also one type of β-1,3-glucan, as described above. It is one type of stored polysaccharide which accumulates in the cells of Euglena, a type of microorganism. This paramylon is described in Carbohydrate Research, 25, 231–242 (1979) and in Japanese Kokai Patent Nos. 64-37297/1989 and 1-37297/1989. Unlike curdlan, paramylon powder does not coagulate when heated, but if necessary, it can be treated with an alkali in order to impart this property. It is also possible to use paramylon in an unrefined form in this invention, but it may also be used in a highly refined form if necessary. β-1,3-glucan derived from microorganisms, particularly curdlan and paramylon, when treated with alkali as described below, and in the presence of valence 2 or higher metal ions such as calcium ions, magnesium ions, copper ions, iron ions, or cobalt ions, cause the formation of a β-1,3-glucan metal ion cross-linked gel. Glucan in this state of being a metal ion cross-linked gel can be obtained by dissolving the microorganism-produced β-1,3-glucan in an aqueous alkali solution and then bringing it in contact with a water-soluble organic solvent to deposit the β-1,3-glucan, which is preferably then neutralized to a pH of 6–7.

Another method of obtaining the metal ion cross-linked gel form β-1,3-glucan is to freeze an aqueous alkali solution of the above β-1,3-glucan and then bring the frozen solution into contact with a water-soluble organic solvent to deposit the β-1,3-glucan, which is then neutralized. The glucan obtained in this manner may be dehydrated, if necessary, to make a dry powder.

The water-soluble organic solvent used in the above described method for depositing the glucan is preferably an alcohol such as methanol. The aqueous alkali solution used to dissolve the glucan may be one prepared with an alkali such as sodium hydroxide, potassium hydroxide, ammonium hydroxide, etc.

The β-1,3-glucan obtained in this manner has, as was previously stated, the ability to form a metal ion cross-linked gel. For example, in this invention, a composition which contains the calcium ion is normally a good adjuvant for this formation.

In this invention, the β-1,3-glucan functions as a viscosity agent. To wit, the β-1,3-glucan increases the viscosity of the hydraulic composition and as a result, it helps to prevent the segregation when pouring and it increases the workability of the concrete.

Any of the superplasticizers which are normally used in concrete may be used as the superplasticizer in the hydraulic composition of this invention. In this specification, the high range AE (air-entraining) water reducing admixture includes a fluidity enhancing agent. Specific examples of such are the naphthalene type agents such as highly condensed formalin naphthalene sulfonate; melamine type agents such as sulfonated melamine formalin condensate; and the carboxylic acid type and lignin type agents.

These materials are used in order to increase the fluidity of the hydraulic composition which has enhanced viscosity and to improve filling properties. Normally, the water reduction can be reduced by about two-fold when compared to the conventional water reducing agent.

The hydraulic composition of this invention normally contains the above-described type of cementitious powder, β-1,3-glucan, and a superplasticizer, but depending upon the application, a fine aggregate can be further added to make a mortar composition, and both fine and coarse aggregates can be included to adjust the composition for concrete applications. Any of the materials used in the prior art as fine and coarse aggregates may be used in the hydraulic composition of this invention.

It is further possible with the hydraulic composition of this invention to add additional additives which are normally used. Examples would include AE agents, AE water reducing agents, water reducing agents, etc.

The mixing method used when water is added to this hydraulic substance is basically the same as the mixing method used in the prior art for concrete. The mixing is normally implemented in accordance with the method wherein water is added. The preferred method of water addition is to make the addition in two separate stages. This method itself may be implemented in the same way it normally is when using a general lot or batch type addition and mixing method. The use of this lot type addition and mixing method improves the resistance to separation of the hydraulic composition. This permits one to reduce the amounts of viscosity agent and superplasticizer which are added to the hydraulic composition, while still achieving the desired fluidity, resistance to segregation, and filling ability.

The following are examples of desirable hydraulic composition ratios which can be used in this invention. The binding material or the binder material below means the composition of cement and its quality improving materials.

With respect to the binding material (the total weight of Portland cement, fly ash and blast furnace slag total weight with a concrete per unit volume of 250–700 kg/m$^3$), 0.01 to 1.0%, 0.2 to 1.0% preferably by weight of β-1,3-glucan and 0.5 to 3.0%, 0.2 to 6.0%, preferably, by weight of superplasticizer would be added.

In cases where some of the binding material has been replaced by silica fume or other silica type ultra-fine powder, approximately 6 to 30% by weight of silica type powder in the binding material is preferred. With respect to the unit binder material weight (Portland cement, fly ash, and blast furnace slag total weight, with a concrete unit volume of 350 to 800 kg/m$^3$), for example, 50 to 100 kg/m$^3$ of unit volume of silica fume, 0.02 to 1.0% by weight of β-1,3-glucan and 0.5 to 3% by weight of superplasticizer would be added.

Following the addition of water to the hydraulic composition of this invention, after a certain period of time has elapsed, it is possible to achieve a formed product. What is meant here by "formed product" means any article or structure made from concrete.

The concrete and other hydraulic compositions of this invention do not require the use of a vibrating machine, etc. to consolidate the concrete at the time that it is poured. Even if such a device is affixed to the forms and used, one needs it only slightly over a short period of time. The aggregate will not separate and it will easily fill all of the corners and hard-to-reach places in the forms.

Because of this, (1) the forms may be of simple construction and light in weight, making them easily handled and offering improved safety and maintenance; and (2) the ability to eliminate the vibrations and the noise from them reduces the health risks to the workers and greatly improves the working environment.

Also, since there is no bleeding or other types of material separation during and after pouring of the concrete, the concrete structure or casting has excellent uniformity and longevity.

EXAMPLE 1

A hydraulic composition with the mix proportion shown in Table 1 was prepared and then tested for fluidity, filling properties, and resistance to segregation.

TABLE 1

| Maximum size of coarse aggregate (mm) | Water-binding material ratio (%) | Sand aggregate ratio (%) | Unit content (Kg/m³) | | |
|---|---|---|---|---|---|
| | | | Water W | Cement C | Blast-furnace slag B |
| 20 | 30 | 41 | 150 | 150 | 150 |

| | | Unit content (Kg/m³) | | | |
|---|---|---|---|---|---|
| Fly ash | Fine aggregate | Coarse aggregate | Admixture (Binding material × WT %) | | |
| F | S | G | Superplasticizer | AE water reducing agent | Viscosity agent |
| 200 | 663 | 940 | 5 (1.0) | 0.75 (0.15) | 1.5 (0.3) |

Superplasticizer: Highly condensed formalin naphthalenesulfonate is used.
AE water reducing agent: Compound polyol lignisulfonate is used.
Viscosity enhancing agent: Curdlan is used.

In order to test the properties, as shown in FIG. 1, multiple reinforcing bars 21 were positioned in form 2 so that they were 35 mm apart in clear distance, and then the hydraulic composition 1 of this invention was poured into the form.

The height of the form was 500 mm and the width was 825mm, with a sloping top surface, and the top surface was partially uncovered.

In this test, the hydraulic composition 1 was simply allowed to flow inside of the form 2. Without using any vibrations, it was possible to achieve a perfectly filled hydraulic composition 1 within the form when observed after about 99 seconds. (FIGS. 1 through 4).

Next, evaluations were made of the strength and durability of the same composition. The data obtained appears in Table 2.

TABLE 2

| Material Age | 7 days | 28 days | 91 days |
|---|---|---|---|
| Compressive Strength (kg f/cm²) | 289 | 429 | 521 |

Freezing and thawing resistance: relative dynamic modulus of elasticity 90% (after 300 cycles) Amount of drying shrinkage: 340 μ (after 4 weeks had elapsed)

The numbers above are at about the same levels as for normal concrete, and no reduction in durability was noted.

The resistance to salt penetration, resistance to sea water, resistance to chemical agents, and resistance to carbonation were better than for normal concrete.

EXAMPLE 2

Commercially available, regular Portland cement (specific surface area of 3250 cm²/g), ground granulated blast-furnace slag (4300 cm²/g) and fly ash (3000 cm²/g) were combined in various ways to make 5 mix proportions as shown in the following Table 3. The slump flow filling ability measurements were carried out.

Figure 5:
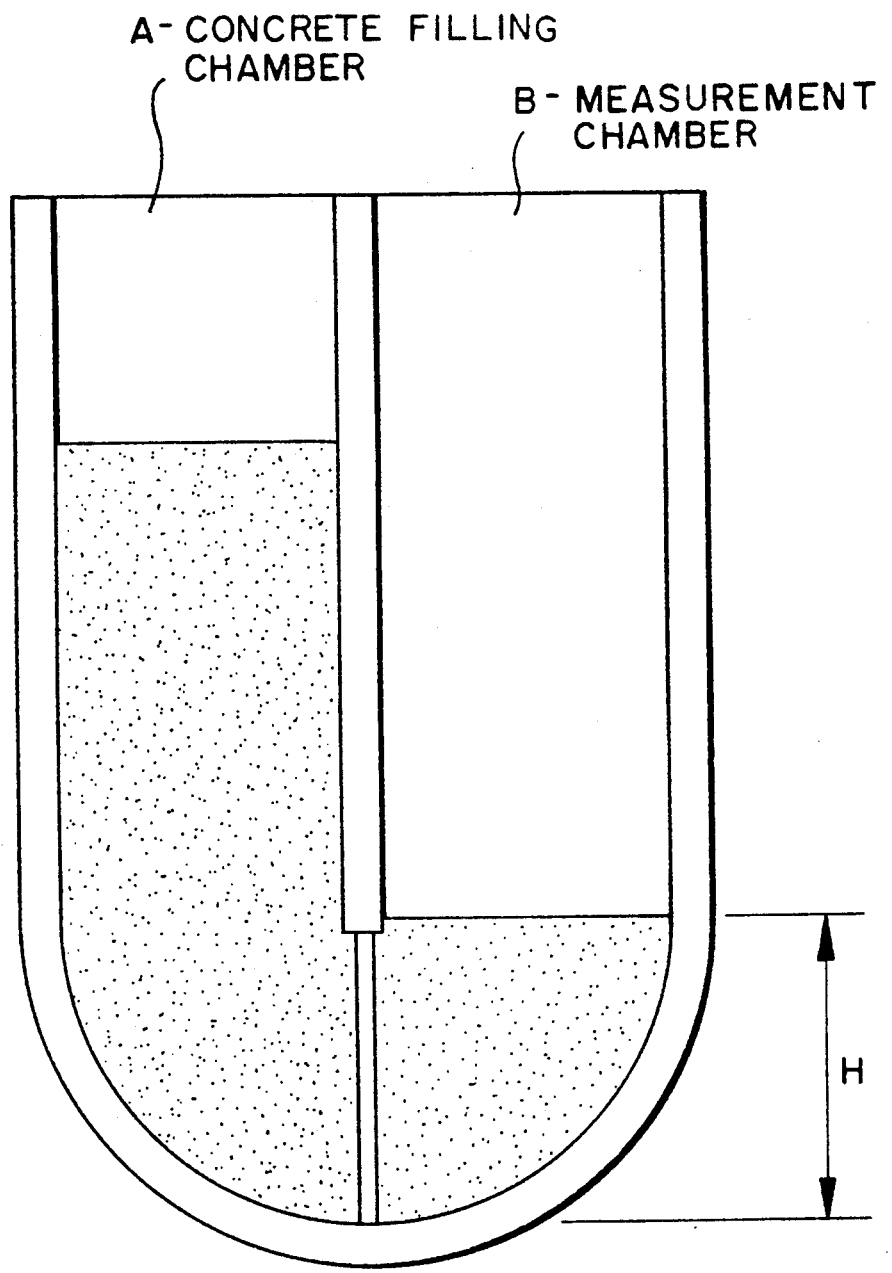
FIG. 5 shows the filling experiment test device used in accordance with the present invention.

The U-shaped container shown in FIG. 5 was used in these tests for filling ability.

There is a concrete filling chamber A on one side of the container, while there was a measurement chamber B on the other side. There were windows placed in the lower part in between the two chambers.

Steel bars 21 were placed vertically at 35 mm intervals through these windows and the chambers were closed off by a shutter until the beginning of the test.

For the test, chamber A was filled with the concrete being tested and the shutter was raised. The height H to which the concrete rose in measurement chamber B was measured as a basis for determining the filling ability.

The results are shown in Table 3 in the lower right column. It was found that, with the particle size of binding material used in this test, the minimum amount of unit binder (cement +blast-furnace slag powder +fly ash) needed to obtain good fluidity and filling ability was 400 kg/m³ (200+200+0) or higher.

Keeping in mind that these results were obtained for multiple steel bars at 35 mm intervals in clear distance, when the interval between the steel bars is greater than this, it would be possible to decrease the unit binder material to a minimum of 350 kg/m³.

TABLE 3

| Mix No. | W (Kg/m³) | C (Kg/m³) | B (Kg/m³) | F (Kg/m³) | S (Kg/m³) | G (Kg/m³) |
|---|---|---|---|---|---|---|
| 1 | 165 | 150 | 150 | 200 | 698 | 884 |
| 2 | 170 | 200 | 200 | — | 925 | 799 |
| 3 | 180 | 225 | 225 | — | 853 | 802 |
| 4 | 180 | 225 | 225 | — | 853 | 802 |
| 5 | 185 | 225 | 225 | — | 840 | 802 |

| Mix No. | SP WT % in Binding material | BP WT % in binding material (WT % in water) | S/A (%) | Slump flow value (cm) | Filling Height H (mm) |
|---|---|---|---|---|---|
| 1 | 1.35 | 9.36 (1.1) | 45 | 67.5 | 320 |
| 2 | 2.0 | 0.34 (0.8) | 55 | 64.0 | 300 |
| 3 | 1.7 | 0.6 (1.5) | 53 | 68.5 | 312 |
| 4 | 1.7 | 0.64 (1.6) | 53 | 57.5 | 345 |
| 5 | 1.6 | 0.66 (1.6) | 53 | 63.3 | 350 |

W: Water
C: Portland cement
B: Ground granulated blast-furnace slag
F: Fly ash
S: Fine aggregate
G: Coarse aggregate
SP: Superplasticizer (Highly condensed formalin naphthalenesulfonate is used)
BP: Viscosity agent (Curdlan is used)
A: (S + G)
S/A: Fine aggregate proportion

EXAMPLE 3

Silica fume was used in place of fly ash of example 2 in the mixture; the mix proportions and test results appear in Table 4.

In Table 4, Mix No. 1 is the base mix while Mix Nos. 2 through 5 are those which used no fly ash at all, but which used silica fume as a substitute.

The results indicated that about 450 kg/m³ of binder (C+B+SF) was adequate. The reason is that with this amount of binder, the fluidity by the slump flow test dropped somewhat, but on the other hand, filling properties were excellent and a sufficient filling height was achieved.

TABLE 4

| Mix No. | W (Kg/m³) | C (Kg/m³) | B (Kg/m³) | F (Kg/m³) | SF (Kg/m³) | S (Kg/m³) | G (Kg/m³) |
|---|---|---|---|---|---|---|---|
| 1 | 165 | 150 | 150 | 200 | — | 698 | 884 |
| 2 | 180 | 200 | 200 | — | 50 | 800 | 845 |
| 3 | 185 | 200 | 200 | — | 50 | 794 | 839 |
| 4 | 190 | 200 | 200 | — | 75 | 774 | 818 |
| 5 | 195 | 200 | 200 | — | 75 | 767 | 811 |

| Mix No. | SP WT % in Binding material | BP WT % in binding material | BP (Kg/m³) | WT % in water | S/A (%) | Slump flow value (cm) | Filling Height H (mm) |
|---|---|---|---|---|---|---|---|
| 1 | 1.35 | 0.36 | (1.82) | (1.1) | 45 | 67.5 | 320 |
| 2 | 1.95 | 0.40 | (1.82) | (1.0) | 50 | 53.3 | 320 |
| 3 | 1.95 | 0.40 | (1.82) | (0.98) | 50 | 55.5 | 313 |
| 4 | 2.20 | 0.35 | (1.61) | (0.87) | 50 | 55.8 | 310 |
| 5 | 2.10 | 0.35 | (1.65) | (0.85) | 50 | 54.0 | 333 |

SF: Silica fume
Other symbols are the same as in Table 3.

As described above, this invention provides the following effects:

(A) It makes it possible to prepare a concrete with high resistance to segregation, high fluidity, and excellent filling ability. Because of this, vibration of the concrete is not necessary during casting; it can simply be poured. This reduces the number of workers needed; through the elimination of the vibrating operation it conserves energy in the operation, and eliminates the need for human intervention so that it is possible to automate or use robots for a large part of the concrete construction operations.

(B) In addition to this invention preventing the segregation of materials which comes from insufficient consolidation, it also prevents the segregation of materials which results from excessive consolidation. Because of this, it has high water impermeability and durability, and results in formed concrete structures which have uniform properties and stable quality.

(C) Since it is not necessary to strictly specify the materials used, any materials which fulfill the specification may be used. It does not require strict quality control, so it may be used in a wide range of on-site operations.

(D) It is also possible to use this invention in preparing pre-stressed concrete without conducting vibration.

What is claimed is:

1. A hydraulic composition comprising a hydraulic cementitious powder, β-1,3-glucan, and a superplasticizer.
2. The hydraulic composition as set forth in claim 1 wherein said β-1,3-glucan is straight chained β-1,3-glucan.
3. The hydraulic composition as set forth in claim 1 wherein said β-1,3-glucan is curdlan.
4. The hydraulic composition as set forth in claim 1 wherein said β-1,3-glucan is paramylon.
5. The hydraulic composition as set forth in claim 1 wherein said superplasticizer is d naphthalene compound.
6. The hydraulic composition as set forth in claim 5 wherein said naphthalene compound is highly condensed formalin naphthalenesulfonate.
7. A hydraulic composition as set forth in claim 1 wherein said hydraulic cementitious powder is cement as binding material.
8. The hydraulic composition as set forth in claim 7 wherein said cement is Portland cement containing one or more quality increasing materials selected from blastfurnace slag, fly ash or silica powder.
9. The hydraulic composition as set forth in claim 7, wherein 0.01 to 1.0% by weight of β-1,3-glucan with respect to said binding material is included.
10. The hydraulic composition as set forth in claim 7 wherein 0.2 to 1.0% by weight of β-1,3-glucan with respect to said binding material is included.
11. The hydraulic composition as set forth in claim 7, wherein 2.0 to 6.0% by weight of said superplasticizer with respect to binding material is included.
12. The hydraulic composition as set forth in claim 7, wherein 0.5 to 3.0% by weight of a high performance water reducing agent with respect to binding material is included.
13. The hydraulic composition as set forth in claim 7 wherein said binding material containing 6 to 30% by weight of silica powder.
14. The hydraulic composition as set forth in claim 1, wherein fine aggregate is added.
15. The hydraulic composition as set forth in claim 1 wherein a coarse aggregate is added.
16. The hydraulic composition as set forth in claim 1 wherein water is added.
17. The hydraulic composition as set forth in claim 16 wherein said water is added in two separate states.
18. A formed product hardened by adding water to a hydraulic composition comprising a hydraulic cementitious powder, β-1,3-glucan and a high performance water reducing agent.
19. The formed product as set forth in claim 18 wherein said product is hardened by adding a fine aggregate and a coarse aggregate.

* * * * *

UNITED STATES PATENT AND TRADEMARK OFFICE
CERTIFICATE OF CORRECTION

PATENT NO. : 5,174,821

DATED : December 29, 1992

INVENTOR(S) : MATSUOKA ET AL.

Page 1 of 2

It is certified that error appears in the above-identified patent and that said Letters Patent is hereby corrected as shown below:

In column 2, line 54, please replace "Alcalioenes" with --Alcaligenes--;

line 55, please replace "Aqrobacterium" with --Agrobacterium--;

line 56, please replace "Alcalioenes" with --Alcaligenes--, and replace "var.(1)" with --var.--.

line 59, please replace "var.(1)" with --var.--

In column 6, line 46, please replace "y.36" with --0.36--.

In column 8, line 12, please replace "d" with --a--.

line 31, please replace "2.0" with --0.2--.

line 38, please replace "containing" with --contains--.

UNITED STATES PATENT AND TRADEMARK OFFICE
CERTIFICATE OF CORRECTION

PATENT NO. : 5,174,821
DATED : December 29, 1992
INVENTOR(S) : MATSUOKA, et al

It is certified that error appears in the above-indentified patent and that said Letters Patent is hereby corrected as shown below:

In column 8, line 41, please replace "fine" with --a fine--.

Signed and Sealed this

Thirty-first Day of August, 1993

*Attest:*

BRUCE LEHMAN

*Attesting Officer*    *Commissioner of Patents and Trademarks*